(12) United States Patent
Nakadaira et al.

(10) Patent No.: US 6,418,593 B1
(45) Date of Patent: Jul. 16, 2002

(54) STRAP AND ATTACHING STRUCTURE THEREOF

(75) Inventors: Fumio Nakadaira; Shinichiro Tsurumaru; Shuji Sasaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/908,619

(22) Filed: Jul. 20, 2001

Related U.S. Application Data (63) Continuation of application No. PCT/JP99/00197, filed on Jan. 20, 1999.

(51) Int. Cl.⁷ .............................................. A45C 13/00
(52) U.S. Cl. ..................... 24/265 EC; 224/257; 24/302
(58) Field of Search ..................... 24/265 EC, 205 AL, 24/301, 302, 298, 315, 164, 182, 2.6; 224/257, 579, 580, 148.6, 600–604, 610, 616, 651; 361/683; 150/107

(56) References Cited

U.S. PATENT DOCUMENTS

| | | | | |
|---|---|---|---|---|
| 1,504,030 A | * | 8/1924 | Dettweiler | 24/302 X |
| 3,326,430 A | * | 6/1967 | Banks | 224/257 X |
| 4,877,167 A | * | 10/1989 | McNemar | 224/257 X |
| 4,911,347 A | * | 3/1990 | Wilhite | 224/257 |
| 6,193,012 B1 | * | 2/2001 | Olivas | 224/257 X |

FOREIGN PATENT DOCUMENTS

| | | |
|---|---|---|
| JP | 44-14132 | 6/1969 |
| JP | 63-48878 | 1/1986 |
| JP | 1-31066 | 10/1987 |
| JP | 5-31938 | 6/1988 |
| JP | 5-218884 | 8/1993 |
| JP | 08-112130 | 5/1996 |
| JP | 3-036035 | 1/1997 |

\* cited by examiner

*Primary Examiner*—Robert J. Sandy
(74) *Attorney, Agent, or Firm*—Staas & Halsey LLP (57) ABSTRACT

A rational and economical strap and a strap attaching structure are provided which allow a hand strap and a neck strap to be attached in a non-independent manner and provide superior working efficiency. A hand strap has engagement portions at ends thereof which can engage with corresponding anchorage portions provided on the apparatus, and each engagement portion has an attaching portion to which a corresponding end portion on a neck strap is attached.

24 Claims, 13 Drawing Sheets

STRAP AND ATTACHING STRUCTURE THEREOF

CROSS-REFERENCE TO RELATED APPLICATIONS

This application is a continuation of PCT/JP99/00197 filed Jan. 20, 1999.

BACKGROUND OF THE INVENTION

1. Field of the Invention

The present invention relates to a strap adapted to be detachably attached to a portable electronic apparatus, such as a handheld terminal, for holding in the hand of an operator of the apparatus, and an attaching structure thereof.

2. Description of the Related Art

An example of a conventional construction of a handheld terminal (hereinafter, referred to as a terminal) is shown in FIGS. 16 to 24. An illustrated terminal 61 has a certain electronic circuit built in the interior thereof, a large-sized LCD display 63 provided on a front side thereof, and a hand strap 65, attached to a back side of the terminal, for holding in the hand of an operator of the terminal.

Figure 19:
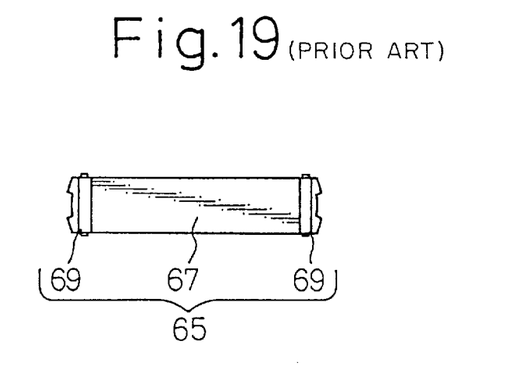
FIG. 19 is a plan view of the whole hand strap as a single component.
Figure 20:
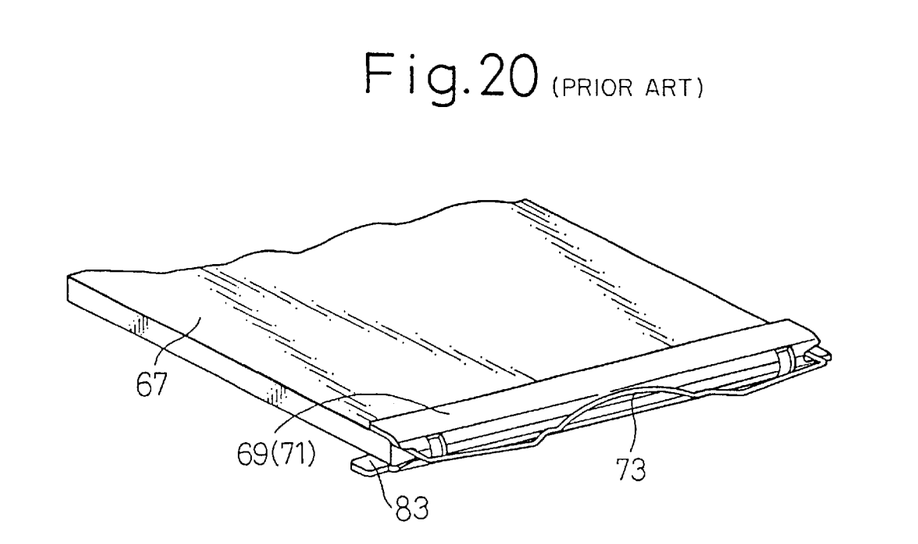
FIG. 20 is a perspective view of an end portion of the hand strap.
Figure 21:
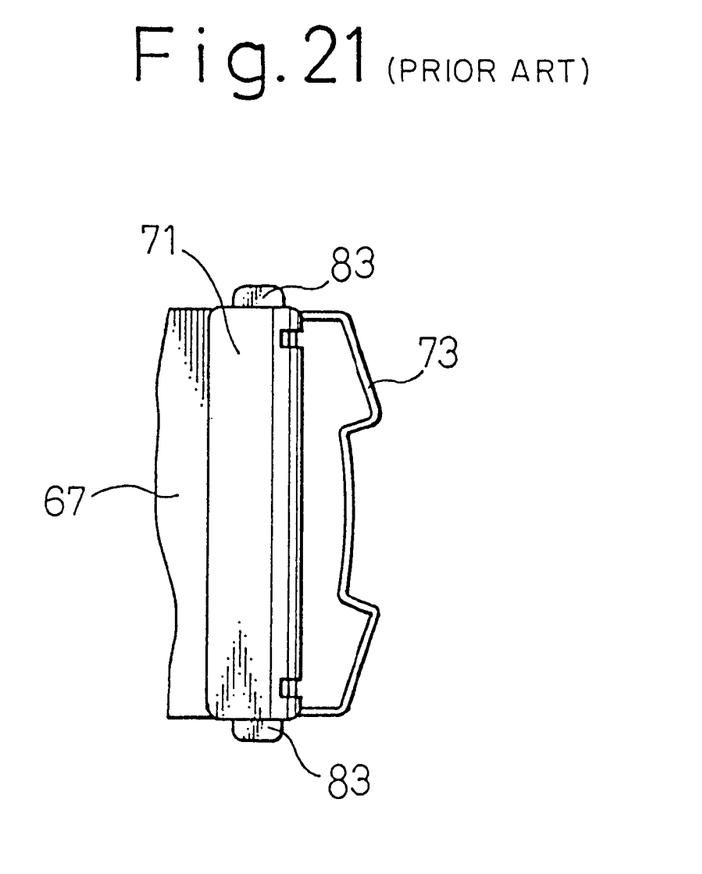
FIG. 21 is a plan view of the end portion of the hand strap.
Figure 22:
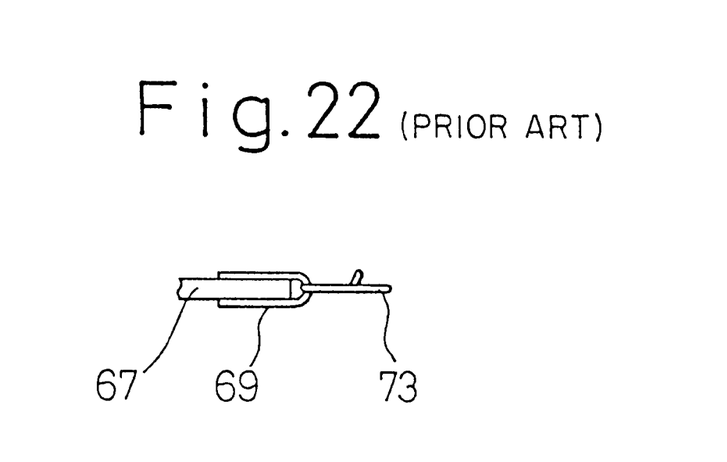
FIG. 22 is a side view of the end portion of the hand strap.
Figure 23:
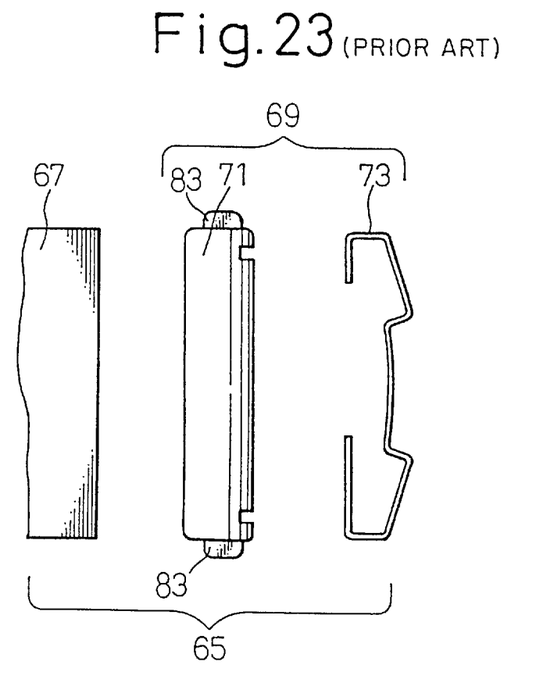
FIG. 23 is an exploded plan view of the end portion of the hand strap.
Figure 24:
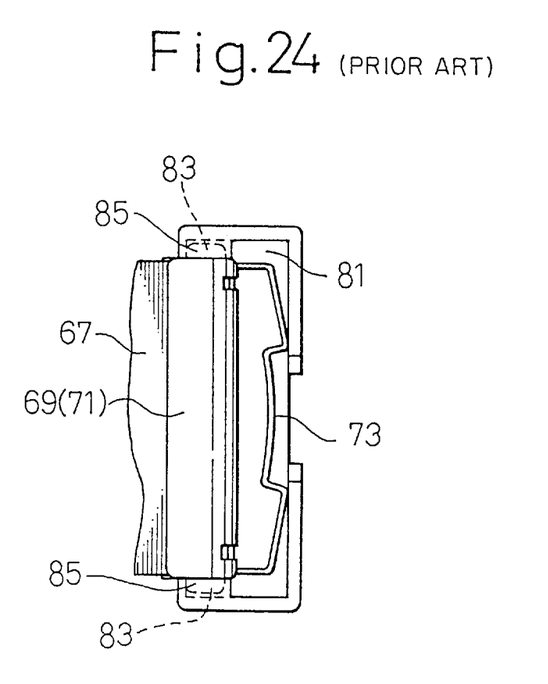
FIG. 24 is a plan view of a main portion of the hand strap showing an attached condition thereof.

The hand strap 65 comprises an elastic band portion 67 such as an elongated rubber band and metal fixture portions 69 at the opposite ends of the band portion (FIG. 19). The metal fixture portion 69 includes a spring 73 which is hooked to a metal fixture portion main body 71 at the widthwise ends thereof and is constructed so as to rise at the center of the spring in a curved fashion (like a thin round metallic rod which is curved in a three-dimensional fashion).

The hand strap 65 is attached to the terminal by inserting the metal fixture portions 69 disposed at the ends of the strap, respectively, into two substantially rectangular recessed portions 81 formed in the back side of the terminal at certain positions at longitudinal ends thereof. As this occurs, the metal fixture portions 69 are pulled in directions in which they approach each other (in other words, in the directions in which the band is restored to its original state) due to the elasticity (the contraction and expansion properties) of the band portion 67, and tongue portions 83 at the widthwise ends of the metal fixture portions 69 are caught by projecting portions 85 in the recessed portions 81 on the back side of the terminal (FIGS. 18, 21 and 24), thus there being no risk of the metal fixture portions 69 being dislocated from the recessed portion in a normal use.

On the other hand, a neck strap, which is suspended from the neck of the operator for carrying the terminal to allow the terminal to be operated or transported is fixed to the back side of the terminal at certain positions, with screws or metal fixtures, separately from the hand strap 65.

In the conventional construction, however, the two straps are independently attached to the terminal, that is, attaching and detaching operations have to be performed for each strap, and this is not economical since the number of components increases accordingly. This problem has been pointed out for a long time.

SUMMARY OF THE INVENTION

An object of the present invention is to provide a reasonable and economical strap attaching structure which can reduce or eliminate the inconveniences in the prior art strap attaching structure, while maintaining durability and force resistance to an extent equal to or greater than those provided by the conventional structure.

The present invention provides a strap adapted to be detachably attached to a portable apparatus, the strap comprising engagement portions provided at respective ends thereof which can engage with corresponding anchoring portions provided on the apparatus, respectively, each of the engagement portions having an attachment portion for attaching a corresponding end of a strap of another type.

Preferably, the engagement portion includes a biasing means for biasing the engagement portion in a direction in which an engaged state is maintained when the engagement portion is brought into engagement with the corresponding anchoring portion. Preferably, the biasing means is a spring. Preferably, the engagement portion includes preventing means for preventing the engagement portion from moving over and beyond the biasing means and being disengaged from the corresponding engagement portion when a force is applied to the engagement portion in a direction substantially opposite to the direction in which the engaged state is maintained. Preferably, the preventing means is a portion extending from the engagement portion and caught by the biasing means when the substantially opposite force is applied to the engagement portion. Preferably, the preventing means includes a mechanism converting the substantially opposite force to a force acting in a direction in which the engagement portion is prevented from moving over the biasing means.

The present invention provides a strap attaching structure for detachably attaching a strap to a portable apparatus, the strap having engagement portions at opposite ends thereof, respectively, the apparatus having corresponding anchorage portions with which the engagement portions of the strap can be brought into engagement, each of the engagement portions of the strap having an attachment portion for attaching a corresponding end of a strap of another type.

The present invention provides a terminal apparatus to which a strap can be detachably attached wherein the strap has engagement portions at respective ends thereof which can be brought into engagement with anchorage portions provided on the terminal apparatus, respectively, the engagement portion of the strap having an attachment portion for attaching a corresponding end of a strap of another type.

BRIEF DESCRIPTION OF THE DRAWINGS

The aforesaid and other objects, features and advantages of the present invention will be described in detail below based on the preferred embodiments illustrated in the accompanying drawings, in which.

DESCRIPTION OF THE EMBODIMENTS

A plurality of embodiments according to the present invention will be described below with reference to the accompanying drawings. Like reference numerals are given to portions and components identical to those of the aforesaid conventional construction, so the repeated description of the identical portions and components are appropriately omitted and only features inherent in the present invention will be described in detail.

Figure 1:
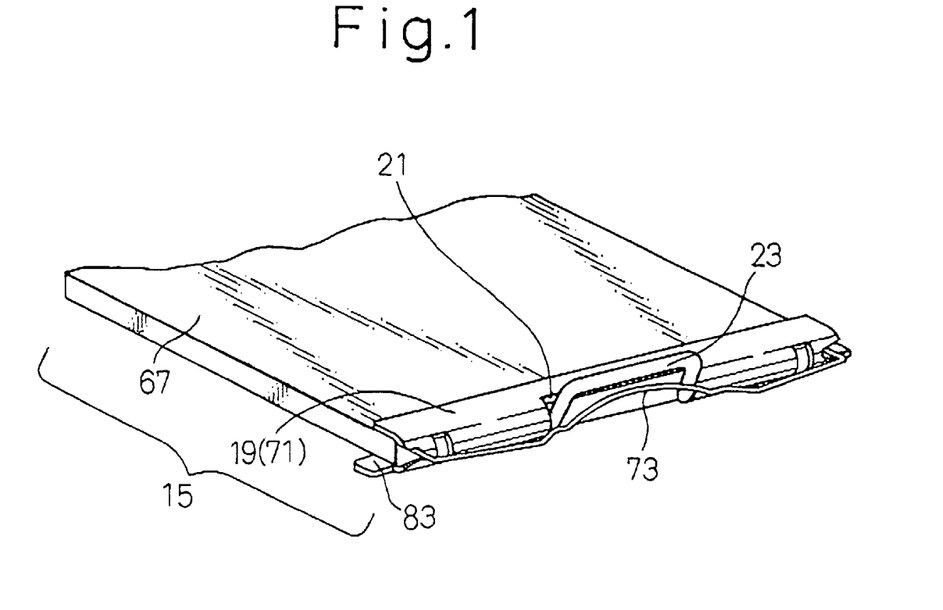
FIG. 1 is a perspective view showing an end portion of a hand strap according to a first embodiment.
Figures 2, 3:
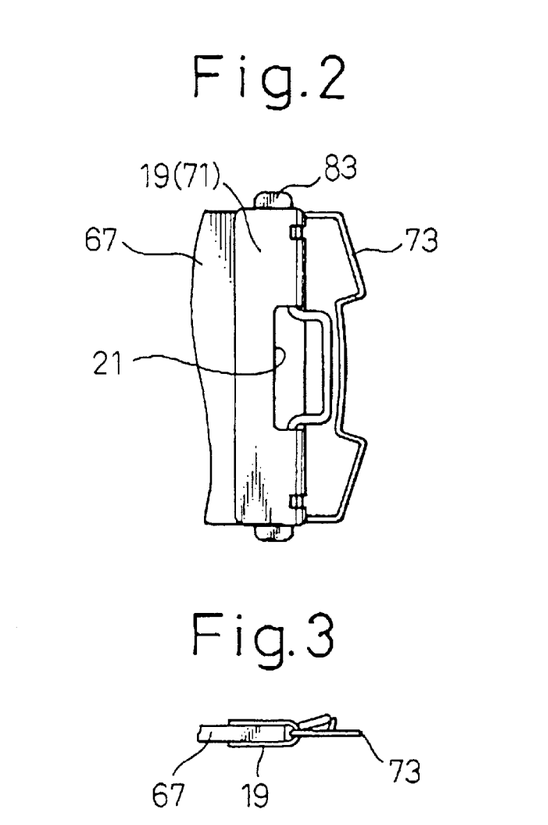
FIG. 2 is a plan view of the end portion of the hand strap according to the first embodiment.
FIG. 3 is a side view of the end portion of the hand strap according to the first embodiment.
Figure 4:
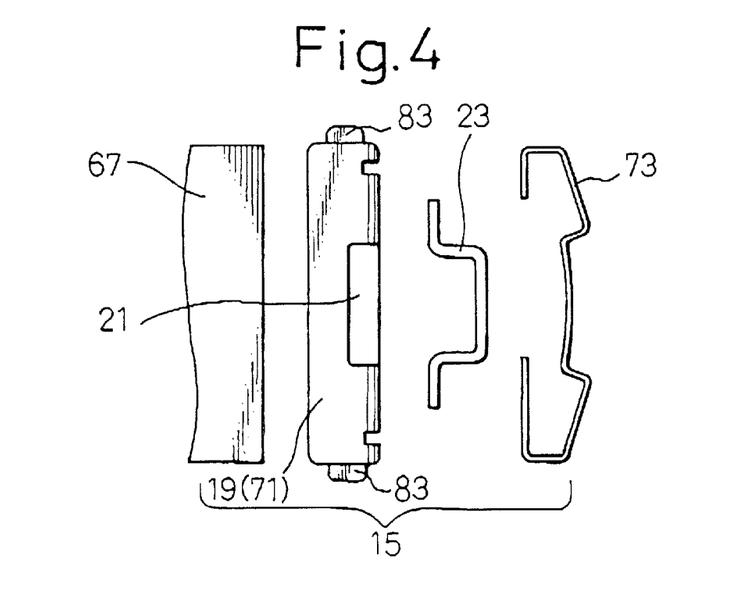
FIG. 4 is an exploded plan view of the end portion of the hand strap according to the first embodiment.

FIG. 1 shows a first embodiment according to the present invention. A metal fixture portion 19 provided at each end of a band portion of a hand strap 15 according to the first embodiment of the invention has a rectangular cutaway portion 21 formed in the center of a metal fixture portion main body 71, and a hook 23 is mounted to the cutaway portion 21 in such a manner as to rotate substantially through 90 degrees, which hook is constituted by a thin circular (from the viewpoint of avoiding damage to a neck strap) metallic (or plastic) rod, which is bent into substantially a Ω shape. One end of a neck strap 95 is attached to the intermediate straight portion of the hook 23.

In the first embodiment constructed as described above, attaching one end of the hand strap 15 to the terminal 61 includes both attaching one end of the neck strap 95 to the terminal 61, and attaching the other end of the hand strap 15 to the terminal 61 . In other words, the attachment of the neck strap 95 to the terminal 61 at the same time as the attachment of the hand strap 15 to the terminal 61. That is, according to the construction of the present invention in which the neck strap is attached to the hand strap, there is no need to provide a mechanism for attaching the neck strap to the terminal on the terminal side. This reduces remarkably problems in attaching and detaching the neck strap that would otherwise have to be borne by the operator and saves costs involved in producing components due to the reduction in the number of constituent components. Thus, the strap attaching structure of the invention is extremely practical.

Figure 5A:
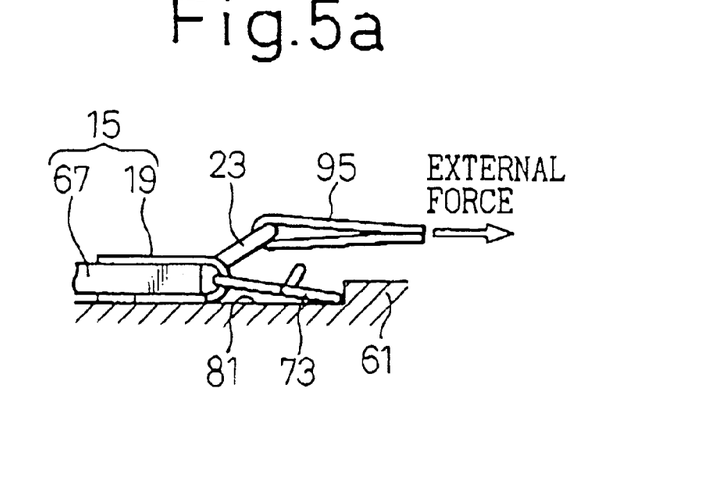
FIGS. 5a to 5c are side views of a main portion of the hand strap according to the present invention, showing an attached condition of the hand strap.
Figure 5B:
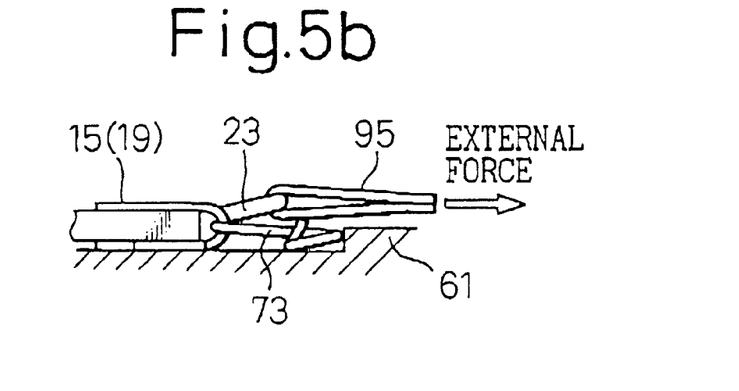
Figure 5C:
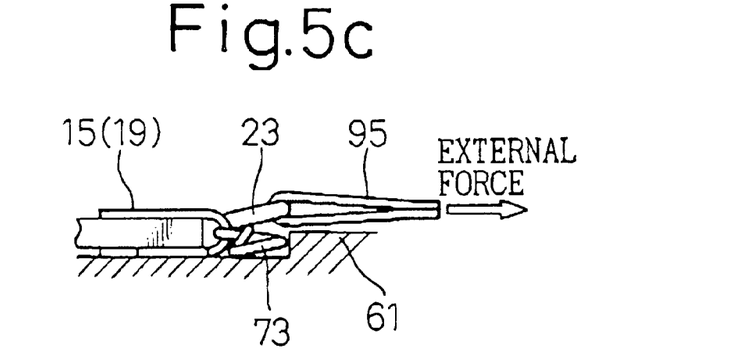

Here, reference is made to FIGS. 5a to 5c which illustrate the manner in which the metal fixture portion 19, which is inserted in and mounted to the recessed portion 81 in the terminal 61, is moved by an external force. When the external force is exerted onto the neck strap 95, the metal fixture portion 19 is moved within the recessed portion 81 as shown in FIGS. 5a to 5c. The direction in which the metal fixture portion 19 moves is a direction in which the hand strap (the metal fixture portion 19) is disengaged. As this occurs, in the event that the external force is stronger, there would be caused a risk of the metal fixture portion 19 moving over and beyond the intermediate portion of the spring 73 (in other words, the intermediate portion of the spring moving under the metal fixture portion 19) to dislocate from the recessed portion 81.

In this case, the following operation and effect can be obtained as a secondary effect of the present invention. Namely, even in the event that one end of the hand strap 15 is dislocated from the terminal 61 (the recessed portion 81), one end of the neck strap 95 still remains attached to one end of the hand strap and if the other end of the hand strap 15 (the neck strap 95) remains attached to the terminal 61, the loop of the neck strap 95 will not be opened. In other words, for example, in a case where the operator suspends the neck strap 95 from his or her neck, one end of the neck strap 95 is attached to the terminal 61 and the loop remains unopened, so the terminal does not fall onto and collide against the floor (and therefore is not broken). This is an excellent benefit which cannot be provided by the prior art structure.

Incidentally, when thinking of a more realistic and practical use, the aforesaid hand strap needs to be constructed such that the hand strap is hardly dislocated. The following two embodiments will solve this problem.

Figure 6:
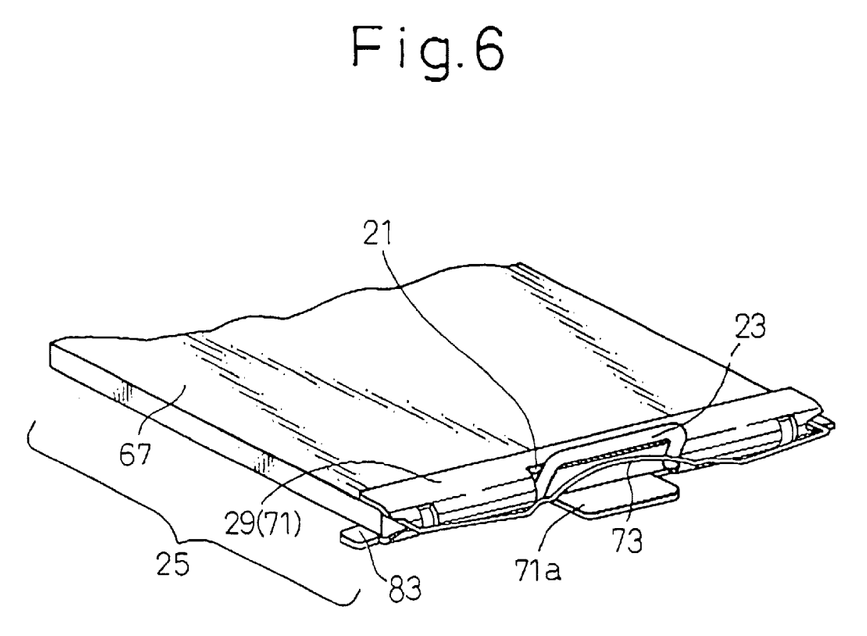
FIG. 6 is a perspective view showing an end portion of a hand strap according to a second embodiment.
Figure 7:
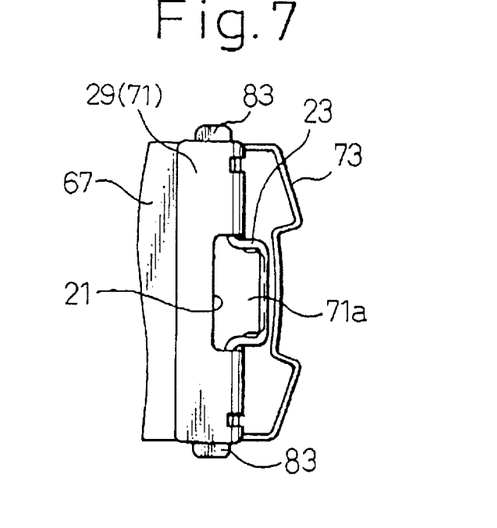
FIG. 7 is a plan view of the end portion of the hand strap according to the second embodiment.
Figure 8:
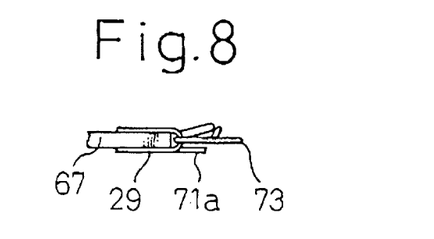
FIG. 8 is a side view of the end portion of the hand strap according to the second embodiment.
Figure 9:
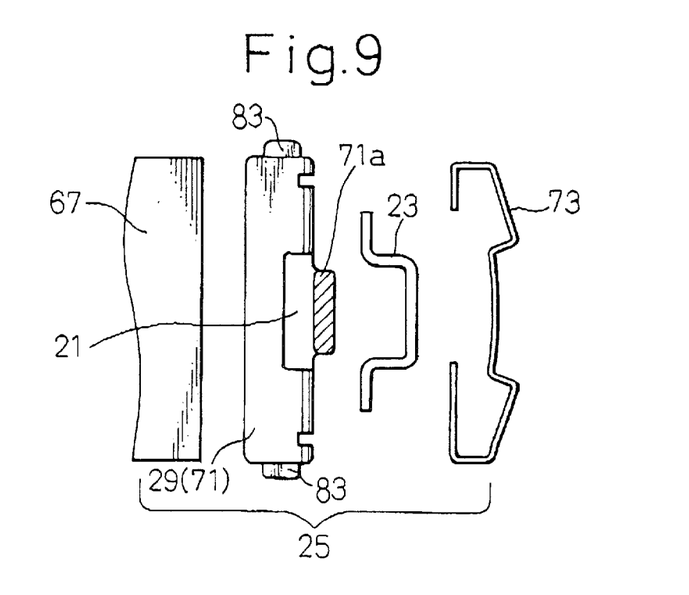
FIG. 9 is an exploded plan view of the end portion of the hand strap according to the second embodiment.

The second embodiment will be described below, referring to FIG. 6, a metal fixture portion 29 (a main body 71) according to the second embodiment is constructed to have a tongue portion 71a (a hatched portion in FIG. 9) provided on the metal fixture portion main body 71, in addition to the construction of the metal fixture portion 19 of the first embodiment.

Figure 10A:
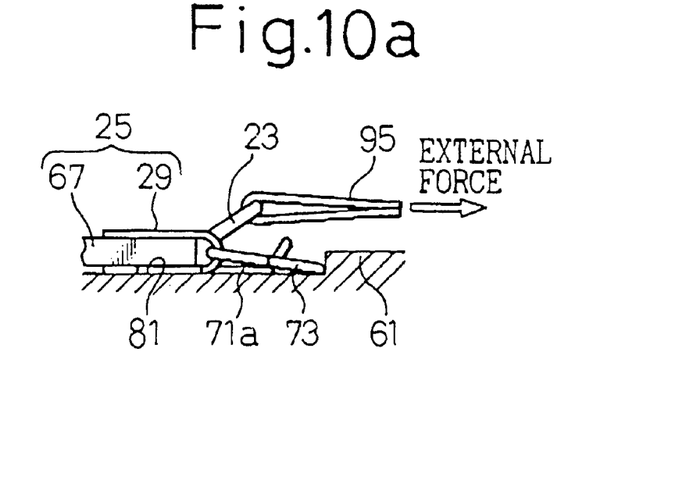
FIGS. 10a to 10c are side views of a main portion of the hand strap according to the present invention, showing an attached condition of the hand strap.
Figure 10B:
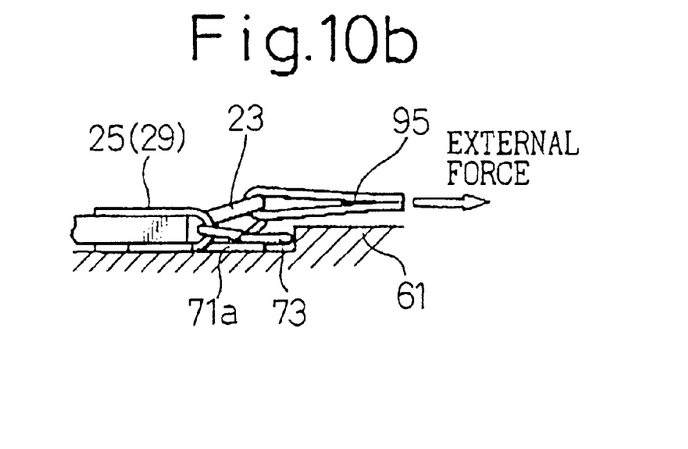
Figure 10C:
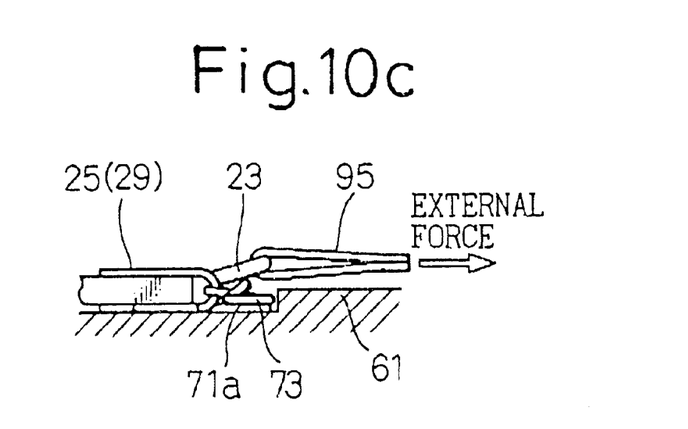

Here, reference is made to FIGS. 10a to 10c illustrating the manner in which the metal fixture portion 29, which is inserted in and mounted to the recessed portion 81 in the terminal 61, is moved by an external force. When the external force is exerted onto the neck strap 95, the metal fixture portion 29 is moved within the recessed portion 81 as shown in FIGS. 10a to 10c. As this occurs, in the event that the external force is stronger, the metal fixture portion 29 tends to move over and beyond the intermediate portion of the spring 23, but the tongue portion 71a interferes with the attempt, and therefore the metal fixture portion 29 is not permitted to move over and beyond the intermediate portion, the attempted movement being thereby prohibited. In other words, the intermediate portion of the spring is not allowed to move under the metal fixture portion 29. Consequently, as this occurs, tongue portions 83 at axial ends of the metal fixture portion 29 remain hooked on projecting portions 85 in the recessed portion in the back side of the terminal. Namely, there is caused no risk of the metal fixture portion 29 being dislocated whereby a hand strap 25 is disengaged from the terminal.

Figure 11:
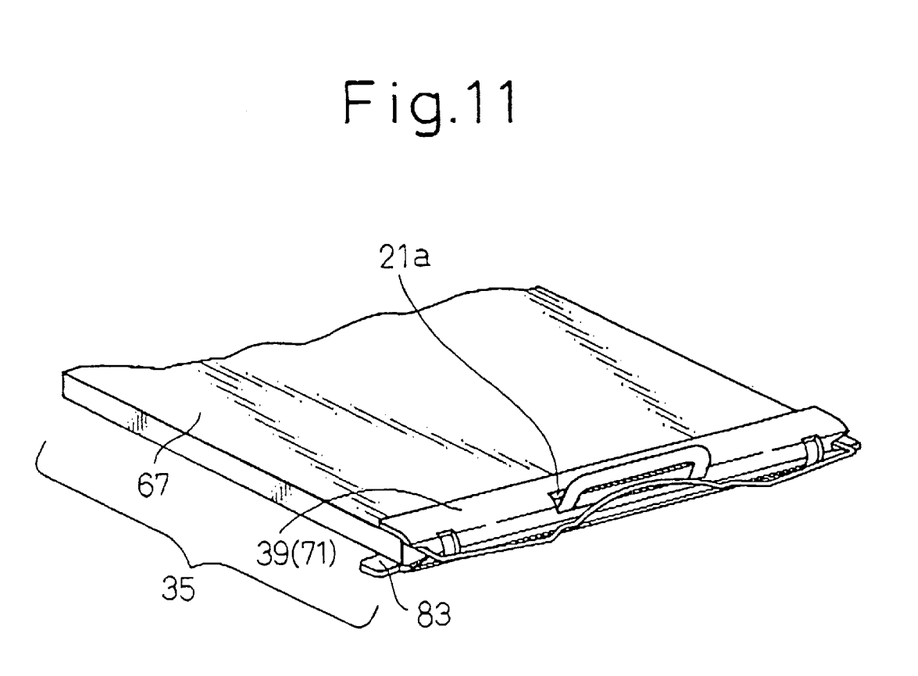
FIG. 11 is a perspective view showing an end portion of a hand strap according to a third embodiment.
Figure 12:
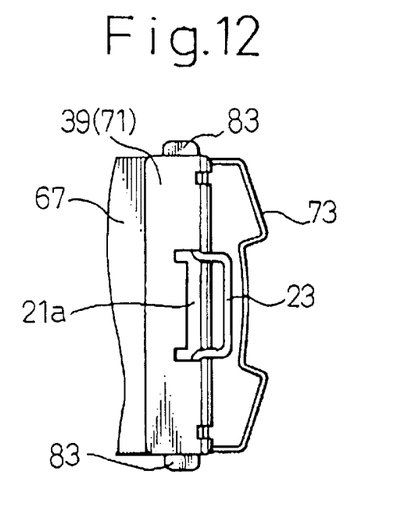
FIG. 12 is a plan view of the end portion of the hand strap according to the third embodiment.
Figure 13:
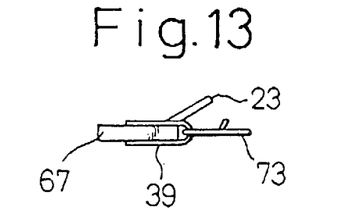
FIG. 13 is a side view of the end portion of the hand strap according to the third embodiment.
Figure 14:
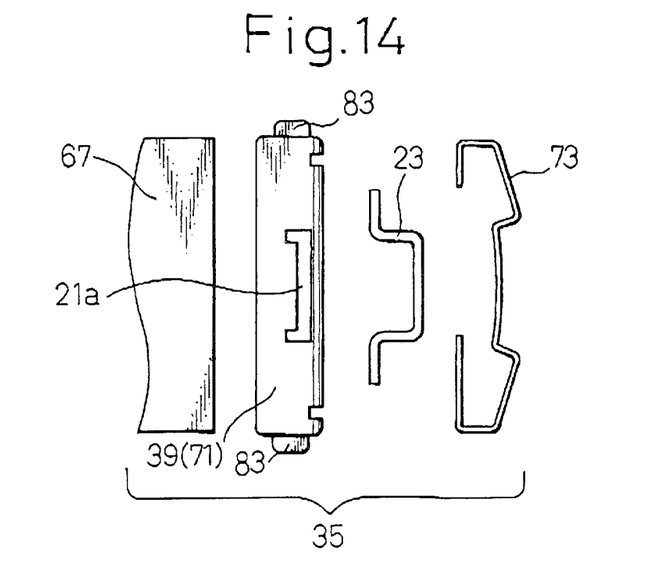
FIG. 14 is an exploded plan view of the end portion of the hand strap according to the third embodiment.

The third embodiment of the present invention will be described. Referring to FIG. 11, the metal fixture portion according to the third embodiment is constructed by slightly modifying the metal fixture portion according to the first embodiment. Namely, the shape of the cutaway portion 21a in the center of the metal fixture portion 39 (71) where the hook 23 is mounted is changed so as to reduce the angle of the hook 23 through which the hook 23 can rotate freely (for example, approximately 60 degrees).

Figure 15A:
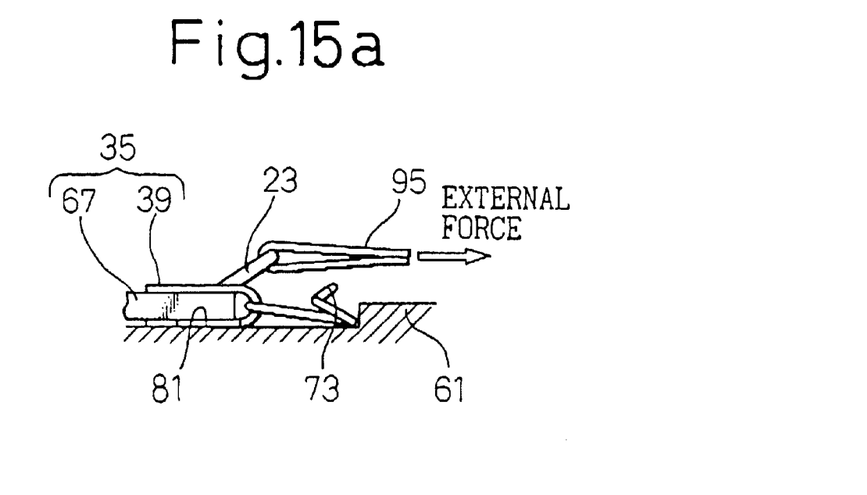
FIGS. 15a to 15c are side views of a main portion of the hand strap according to the present invention, showing an attached condition of the hand strap.
Figure 15B:
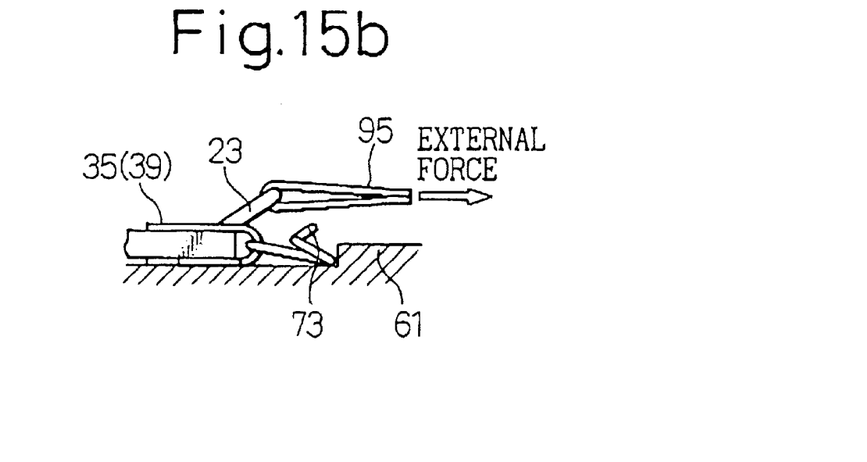
Figure 15C:
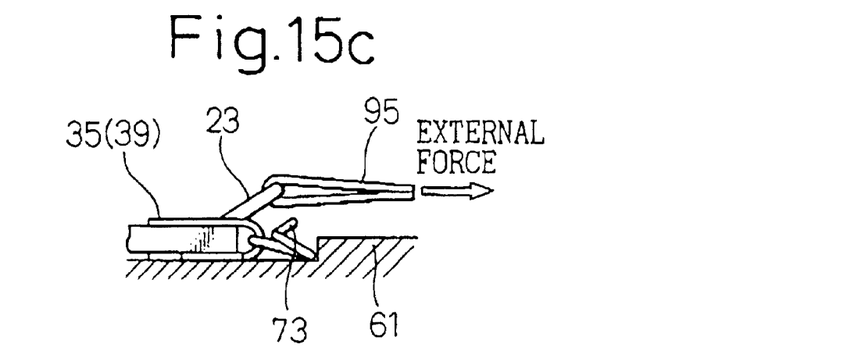
Figure 16:
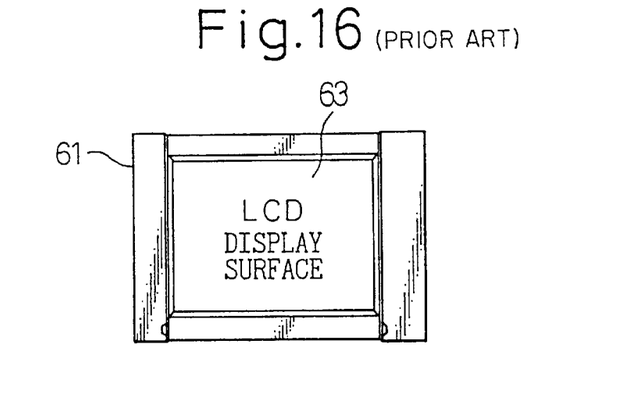
FIG. 16 is a front view of a handheld terminal showing only a display portion.
Figure 17:
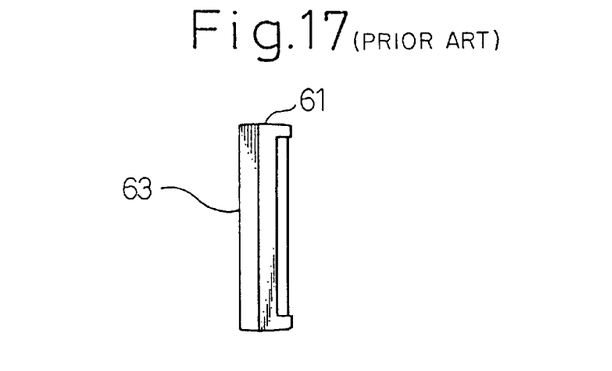
FIG. 17 is a side view of the handheld terminal as viewed from the right hand-side thereof.
Figure 18:
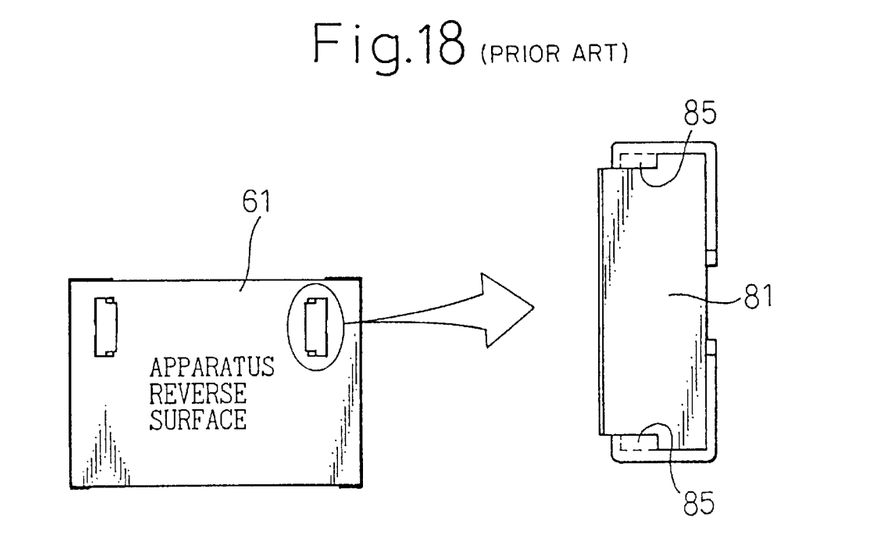
FIG. 18 is a rear view of the handheld terminal showing part of a back side thereof.

Here, reference is made to FIGS. 15a to 15c illustrating the manner in which the metal fixture portion 39, which is inserted in and mounted to the recessed portion 81 in the terminal 61, is moved by an external force. When the external force is exerted onto the neck strap 95, the metal fixture portion 39 is moved within the recessed portion 81 as shown in FIGS. 15a to 15c. As this occurs, the external force (or a component of the external force) is exerted onto the metal fixture portion 39 in such a manner as to press the metal fixture portion 39 against the bottom of the recessed portion, whereby the metal fixture portion 39 is prevented from moving over and beyond the intermediate portion for the spring 73. In other words, the intermediate portion of the spring does not move under the metal fixture port 39. Namely there is caused no risk of the metal fixture portion 39 being dislocated from a recessed portion 81 in the terminal 61, the dislocation of a hand strap 35 from the terminal being thereby prevented.

As has been described heretofore, according to the strap and the attaching structure thereof according to the present invention, the following advantages can be obtained.

(1) Labor-saving and simplified strap attaching and detaching work is made possible, whereby the load borne by the operator can be reduced.

(2) The strap can be attached with durability and force resistance which are equal to or better than those of the conventional strap attaching structure.

(3) The number of components can be drastically reduced, and therefore the structure of the invention is rational and economical.

What is claimed is:

1. A strap adapted to be detachably attached to a portable apparatus, said strap comprising engagement portions provided at respective ends thereof which can engage with corresponding anchorage portion s provided on said apparatus, respectively, each of said engagement portions having an attachment portion for attaching of a corresponding end of a strap of another type,
   wherein each said engagement portion includes a spring for biasing said engagement portion in a direction in which an engaged state is maintained when said engagement portion is brought into engagement with said corresponding anchorage portion.

2. A strap as set forth in claim 1, wherein each said engagement portion includes preventing means for preventing each said engagement portion from moving over and beyond said spring and being disengaged from said corresponding anchorage portion when a force is applied to said engagement portion in a direction substantially opposite to the direction in which said engaged state is maintained.

3. A strap as set forth in claim 2, wherein said preventing means is a portion extending from said engagement portion and caught by said spring when said substantially opposite force is applied to said engagement portion.

4. A strap as set forth in claim 2, wherein said preventing means includes a mechanism converting said substantially opposite force to a force acting in a direction in which said engagement portion is prevented from moving over said spring.

5. A strap attaching structure for detachably attaching a strap to a portable apparatus, said strap having engagement portions at opposite ends thereof, respectively, said apparatus having corresponding anchorage portions with which said engagement portions of said strap can be brought into engagement, each of said engagement portions of said strap having an attachment portion for attaching a corresponding end of a strap of another type,
   wherein each said engagement portion includes a spring for biasing said engagement portion in a direction in which an engaged state is maintained when said engagement portion is brought into engagement with said corresponding anchorage portion.

6. A structure as set forth in claim 5, wherein each said engagement portion includes preventing means for preventing each said engagement portion from moving over and beyond said spring and being disengaged from said corresponding anchorage portion when a force is applied to said engagement portion in a direction substantially opposite to the direction in which said engaged state is maintained.

7. A structure as set forth in claim 6, wherein said preventing means is a portion extending from said engagement portion and caught by said spring when said substantially opposite force is applied to said engagement portion.

8. A structure as set forth in claim 6, wherein said preventing means includes a mechanism converting said substantially opposite force to a force acting in a direction in which said engagement portion is prevented form moving over said spring.

9. A terminal apparatus to which a strap can detachably be attached, wherein said strap has, at ends thereof, engagement portions which can be brought into engagement, respectively, with corresponding engagement portions provided on said terminal apparatus and wherein said engagement portions of said strap have attaching portions to which corresponding ends of a strip of another type can be attached, respectively,
   wherein each said engagement portion includes a spring for biasing said engagement portion in a direction in which an engaged state is maintained when said engagement portion is brought into engagement with said corresponding anchorage portion.

10. An apparatus as set forth in claim 9, wherein said engagement portion includes preventing means for preventing each said engagement portion from moving over and beyond said biasing means and being disengaged from said corresponding anchorage portion when a force is applied to said engagement portion in a direction substantially opposite to the direction in which said engaged state is maintained.

11. An apparatus as set forth in claim 10, wherein said preventing means is a portion extending from said engagement portion and caught by said biasing means when said substantially opposite force is applied to said engagement portion.

12. An apparatus as set forth in claim 10, wherein said preventing means includes a mechanism converting said substantially opposite force to a force acting in a direction in which said engagement portion is prevented from moving over said biasing means.

13. A first strap adapted to be detachably attached to a portable apparatus, said first strap comprising engagement portions provided at respective ends thereof which can engage with corresponding anchorage portions provided on said apparatus, which can engage with corresponding anchorage portions provided on said apparatus, respectively, each of said engagement portions having an attachment portion for attaching a corresponding end of a second strap, wherein each said engagement portion includes a device for biasing said engagement portion in a direction in which an engaged state is maintained when said engagement portion is brought into engagement with said corresponding anchorage portion.

14. A strap as set forth in claim 13, wherein each said engagement portion includes a device for preventing each said engagement portion from moving over and beyond said biasing device and being disengaged from said corresponding anchorage portion when a force is applied to said engagement portion in a direction substantially opposite to the direction in which said engaged state is maintained.

15. A strap as set forth in claim 14, wherein said preventing device is a portion extending from said engagement portion and caught by said biasing device when said substantially opposite force is applied to said engagement portion.

16. A strap as set forth in claim 14, wherein said preventing device includes a mechanism converting said substantially opposite force to a force acting in a direction in which said engagement portion is prevented from moving over said biasing device.

17. A structure for detachably attaching a first strap to a portable apparatus, said first strap having engagement portions at opposite ends thereof, respectively, said apparatus having corresponding anchorage portions with which said engagement portions of said strap can be brought into engagement, each of said engagement portions of said first strap having an attachment portion for attaching a corresponding end of a second strap, wherein each said engagement portion includes a device for biasing said engagement portion in a direction in which an engaged state is maintained when said engagement portion is brought into engagement with said corresponding anchorage portion.

18. A structure as set forth in claim 17, wherein each said engagement portion includes a device for preventing each said engagement portion from moving over and beyond said biasing device and being disengaged from said corresponding anchorage portion when a force is applied to said engagement portion in a direction substantially opposite to the direction in which said engaged state is maintained.

19. A structure as set forth in claim 18, wherein said preventing device is a portion extending from said engagement portion and caught by said biasing device when said substantially opposite force is applied to said engagement portion.

20. A structure as set forth in claim 18, wherein said preventing device includes a mechanism converting said substantially opposite force to a force acting in a direction in which said engagement portion is prevented from moving over said biasing device.

21. A terminal apparatus to which a first strap can detachably be attached, wherein said first strap has, at ends thereof, engagement portions which can be brought into engagement, respectively, with corresponding engagement portions provided on said terminal apparatus, wherein said engagement portions of said strap have attaching portions to which corresponding ends of a second strap can be attached, respectively, and wherein each said engagement portion includes a device for biasing said engagement portion in a direction in which an engaged state is maintained when said engagement portion is brought into engagement with said corresponding anchorage portion.

22. An apparatus as set forth in claim 21, wherein each said engagement portion includes a device for preventing each said engagement portion from moving over and beyond said biasing device and being disengaged from said corresponding anchorage portion when a force is applied to said engagement portion in a direction substantially opposite to the direction in which said engaged state in maintained.

23. An apparatus as set forth in claim 22, wherein said preventing device is a portion extending from said engagement portion and caught by said biasing device when said substantially opposite force is applied to said engagement portion.

24. A strap as set forth in claim 22, wherein said preventing device includes a mechanism converting said substantially opposite force to a force acting in a direction in which said engagement portion is prevented from moving over said biasing device.

* * * * *

UNITED STATES PATENT AND TRADEMARK OFFICE
CERTIFICATE OF CORRECTION

PATENT NO.    : 6,418,593 B1
DATED         : July 16, 2002
INVENTOR(S)   : Fumio Nakadaira et al.

It is certified that error appears in the above-identified patent and that said Letters Patent is hereby corrected as shown below:

Title page,
Item [57], ABSTRACT please replace with the following:
A strap and a strap attaching structure allow a hand strap and a neck strap to be attached together. The hand strap has engagement portions at ends thereof which engage corresponding anchorage portions provided on an apparatus, and each engagement portion has an attaching portion to which a corresponding end portion on the neck strap is attached. --

Column 4,
Line 43, change "portion s" to -- portions --.

Column 6,
Lines 64-65, delete "which can engage with corresponding anchorae portions provided on said apparatus,".

Signed and Sealed this

Fourth Day of February, 2003

JAMES E. ROGAN
*Director of the United States Patent and Trademark Office*